United States Patent [19]

Barry

[11] 4,096,033
[45] Jun. 20, 1978

[54] CORE FOR A NUCLEAR REACTOR

[75] Inventor: Robert F. Barry, Monroeville, Pa.

[73] Assignee: Westinghouse Electric Corp., Pittsburgh, Pa.

[21] Appl. No.: 588,925

[22] Filed: Jun. 20, 1975

Related U.S. Application Data

[63] Continuation of Ser. No. 321,410, Jan. 5, 1973.

[51] Int. Cl.² .............................................. G21C 3/30
[52] U.S. Cl. ...................................... 176/78; 176/17; 176/18; 176/82
[58] Field of Search ...................... 176/17, 18, 40, 78, 176/82

[56] References Cited

U.S. PATENT DOCUMENTS

| | | | |
|---|---|---|---|
| 3,022,240 | 2/1962 | Bassett | 176/82 |
| 3,093,563 | 6/1963 | Menke | 176/17 |
| 3,104,219 | 9/1963 | Sulzer | 176/78 |
| 3,140,234 | 7/1964 | Loewenstein | 176/17 |
| 3,287,224 | 10/1966 | Loewenstein | 176/18 |
| 3,362,882 | 1/1968 | Sofer et al. | 176/18 |
| 3,364,119 | 1/1968 | Nims et al. | 176/18 |
| 3,660,227 | 5/1972 | Ackroyd et al. | 176/17 |
| 3,745,069 | 7/1973 | Sofer et al. | 176/78 |
| 3,802,995 | 4/1974 | Fritz et al. | 176/78 |
| 3,844,886 | 10/1974 | Crowther | 176/17 |
| 3,910,818 | 10/1975 | Sofer | 176/30 |

FOREIGN PATENT DOCUMENTS

| | | | |
|---|---|---|---|
| 1,117,165 | 6/1968 | United Kingdom | 176/40 |
| 1,299,038 | 12/1972 | United Kingdom | 176/40 |

OTHER PUBLICATIONS

Nuclear Science Abstract #14565, vol. 14 (7/31/60) p. 1837.

Primary Examiner—Verlin R. Pendegrass
Assistant Examiner—S. A. Cangialosi
Attorney, Agent, or Firm—Edward L. Levine; Z. L. Dermer

[57] ABSTRACT

A reactor core having tandem arranged fuel regions for use in a water moderated nuclear reactor. An upper core region is fueled with enriched uranium oxide; while, a lower core region is fueled with a plutonium oxide. An intermediate core region contains natural uranium oxide.

6 Claims, 4 Drawing Figures

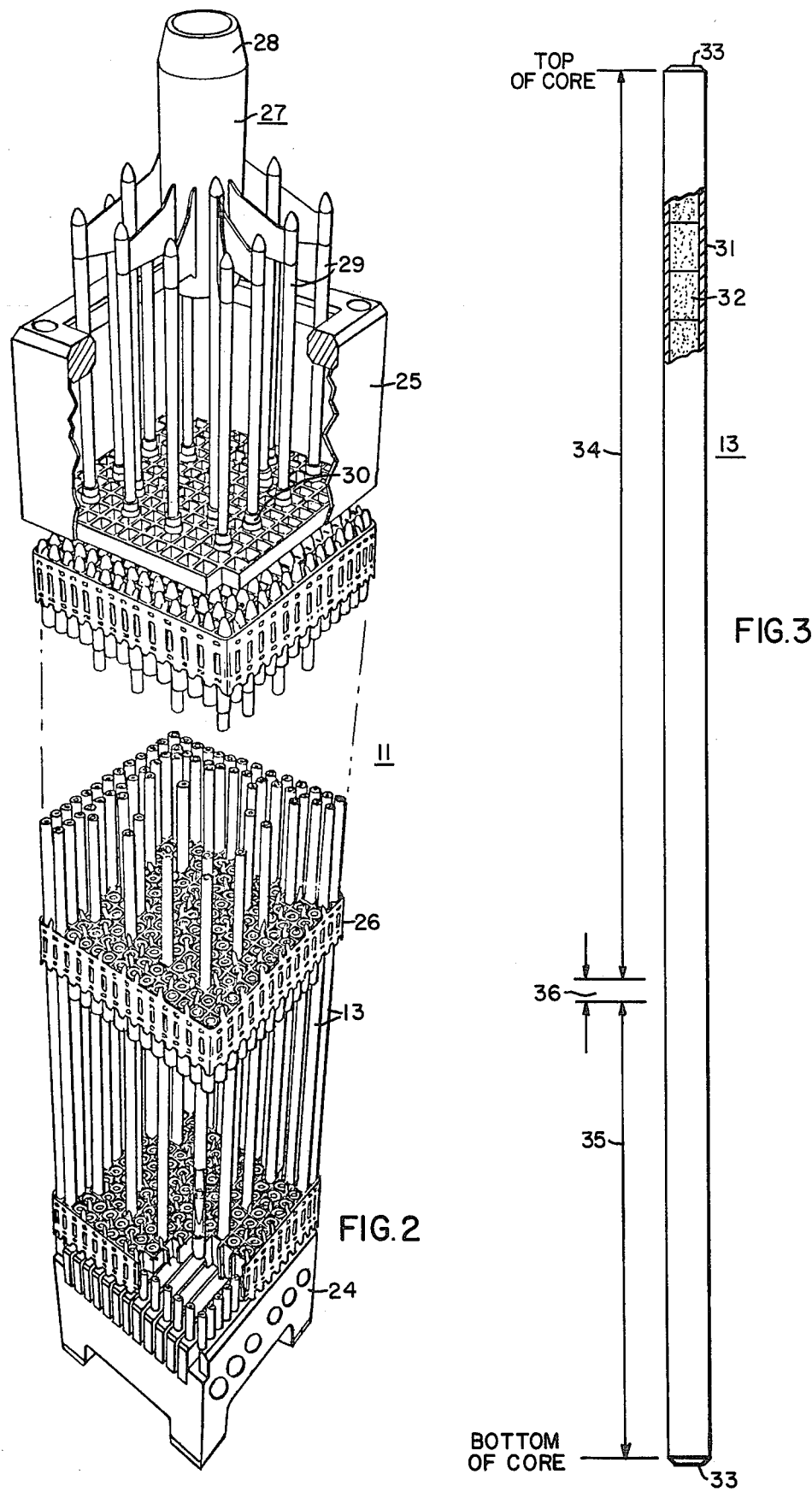

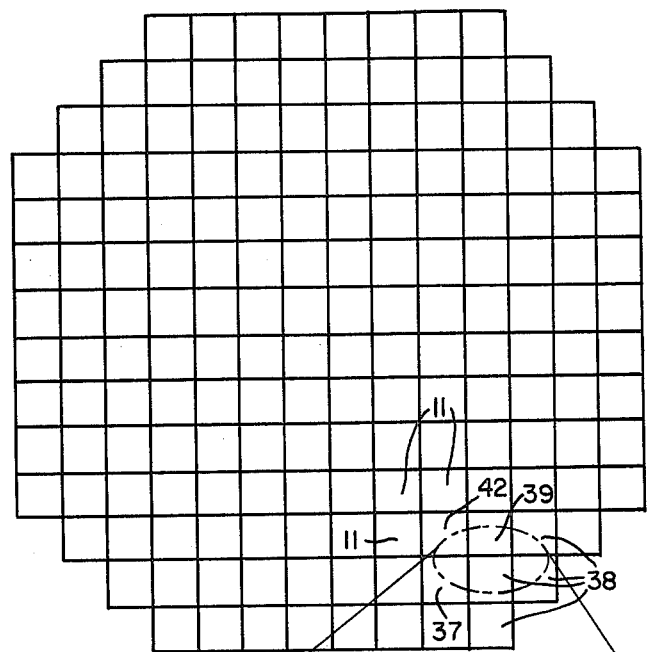
FIG.4
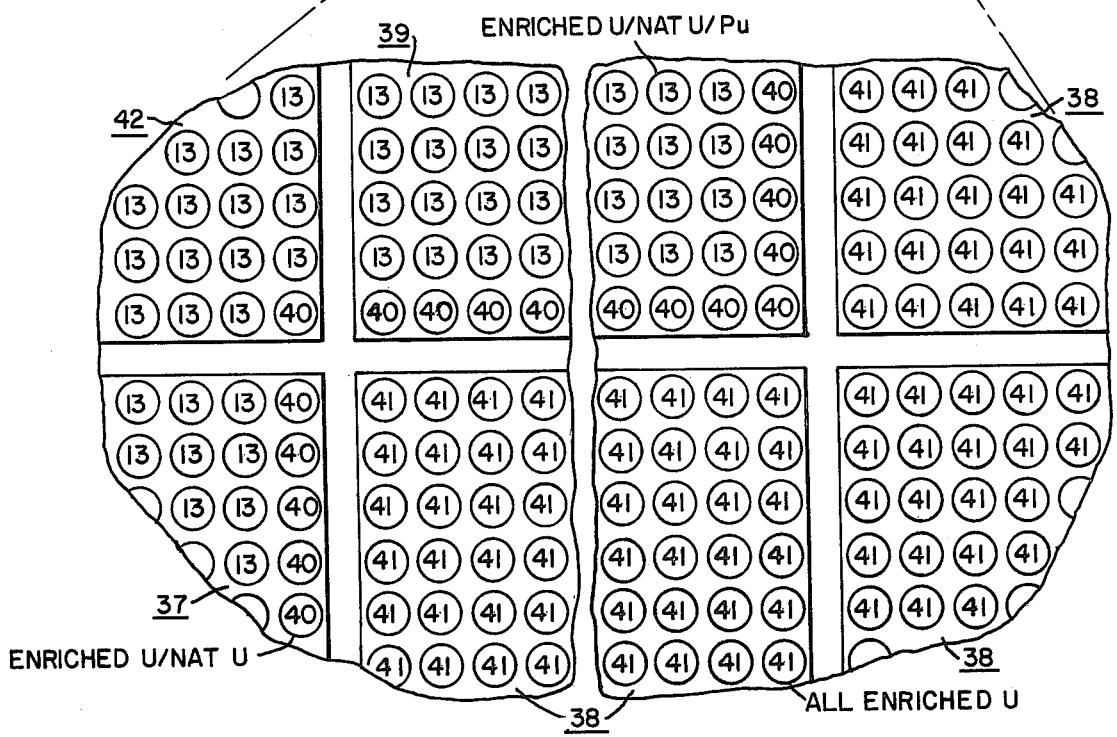

CORE FOR A NUCLEAR REACTOR

This is a Continuation of application Ser. No. 321,410 filed Jan. 5, 1973.

BACKGROUND OF THE INVENTION

1. Field of the Invention

This invention relates to nuclear reactors and more particularly to a nuclear core for a water moderated nuclear reactor.

2. Description of the Prior Art

In the past, fuel elements and hence, nuclear cores have been advanced having differing amounts of fissile plutonium mixed with enriched uranium-235 for use in thermal or "slow" reactors. However, the actual usage of plutonium-239 in nuclear reactors of this type, for example, a water moderated nuclear reactor, has been particularly nil. The foremost reason being that fissile plutonium-239 simply does not exist in a natural state in those quantities which would be required for reactor usage. Another reason is that plutonium-239 which is produced as a fission by-product, that is, the plutonium generated during reactor operation, has not hithertofore been made available for commercial power generation. Still other reasons for the non-use of fissile plutonium involve the deleterious effects of the physical presence of plutonium within cores of thermal reactors. Some of the more important of these effects are described below:

The high neutronic capture cross-section of plutonium-239, as compared to uranium-235, has a negative influence on control rod worth. Since plutonium is more of a neutron poison that uranium, it suppresses the neutron flux thereby lowering the worth of the control rods.

The strong moderator temperature coefficient of plutonium results in a more negative temperature coefficient of reactivity which increases control requirements.

A sharp power peak occurs at interfaces of plutonium with uranium when the two nuclear fuels are combined in other than a homogeneous mixture.

In the near future, it is expected that significant quantities of fissile plutonium will become available due to the large number of water moderated commercial nuclear power plants now in operation, or near operation, as well as future fast breeder nuclear reactors. Since fissile plutonium is generated within these reactors as an irradiation by-product, it is less expensive than enriched uranium-235; accordingly, its use is highly desirable. However, before this economic advantage may be realized it is necessary to be able to negative the heretofore described adverse affects of the physical presence of plutonium within nuclear cores. No such solution exists in the prior art.

SUMMARY OF THE INVENTION

The nuclear core of a thermal reactor is arranged into three tandem fuel zones. An uppermost zone, comprising approximately two-thirds of the length of the core, is filled with enriched uranium-235. A lowermost zone, comprising approximately one-third of the length of the core, contains recycled, fissile plutonium-239. An intermediate zone of natural uranium, approximately two inches long, is interposed between the upper and lower zones of active fuel material.

In this manner, the present core arrangement utilizes substantial quantities of plutonium while effectively alleviating many of the problems which existed in the prior art. By locating the plutonium near the bottom of the core where, in limiting cases, the control rod worth is nearly zero, the impact of plutonium on control rod worth is minimized. Further, the present core lessens the effect of the strong plutonium moderator temperature coefficient of reactivity on control requirements by reducing the full load to no load temperature swing in the plutonium zone. Moreover, this core minimizes the plutonium coefficient impact on cool-down accidents which, in limiting cases, are dominated by the upper region of the core due to non-uniform fuel depletion.

Another prior art problem alleviated by the present invention concerns the power spike at the plutoniumenriched uranium interface. The intermediate zone of natural uranium separates the more active zones of the nuclear core thereby depressing the nuclear flux and eliminating power peaking at the enriched uranium-plutonium interface. By locating the plutonium below the core centerline, the plutonium enriched uranium interface is located in an assured area of non-critical heat flux.

BRIEF DESCRIPTION OF THE DRAWINGS

Other advantages of the invention will be apparent from the following detailed description taken in consideration with the accompanying drawings, in which:

FIG. 2 is a fragmentary, isometric view of a fuel assembly for the nuclear reactor of FIG. 1 to which the principles of this invention may be applied;

FIG. 3 is a simplified schematic of a fuel element for the fuel assembly of FIG. 2 constructed in accordance with the principles of this invention; and FIG. 4 is a cross sectional view taken along the line IV—IV of the nuclear core of FIG. 1.

DESCRIPTION OF THE PREFERRED EMBODIMENTS

Figure 1:
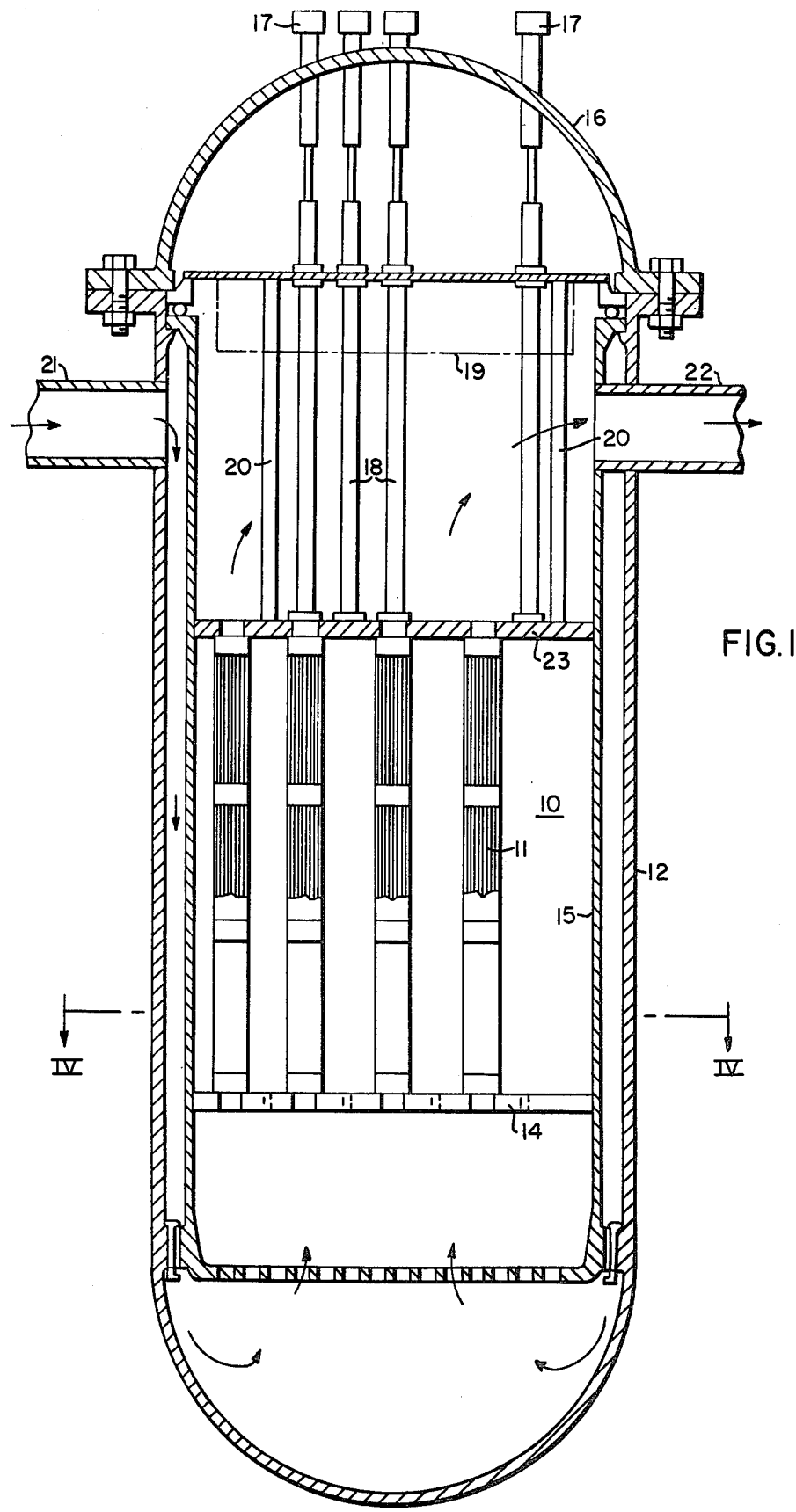
FIG. 1 is a vertical cross sectional view of one form of a nuclear reactor to which this invention may be applied.

Throughout the description which follows, like reference characters indicate like elements in the various figures of the drawings.

Referring now more particularly to FIG. 1 of the drawings, a thermal type of nuclear reactor is illustrated therein. It is to be noted, that although FIG. 1 shows a particular type of reactor, specifically a pressurized water moderated reactor, the invention is not thereby limited to this particular type of thermal reactor. A nuclear core 10 comprising a plurality of fuel assemblies 11 is contained within a pressure vessel 12. The relatively few fuel assemblies 11 shown in FIG. 1 is for purposes of simplicity, in reality, a typical nuclear reactor may contain as many as one hundred and ninety three fuel assemblies 11. The nuclear core 10 is fixed between upper and lower core plates 23 and 14, respectively, which axially support the nuclear core 10 by transmitting the flow and load forces to a core barrel 15 which in turn transfers these forces to the reactor pressure vessel 12.

The upper end of the reactor pressure vessel 12 is hermetically sealed by a removable closure head 16 upon which are mounted a plurality of control rod drive mechanisms 17. Again for simplicity, only a few of the many control drive mechanisms 17 are shown. Each rod drive mechanism 17 is connected to a control rod assembly (not shown) which extends through the closure head 16, through control rod guide tubes 18, and thence into the nuclear core 10 through guide thimbles provided within the fuel assemblies 11. The control rods serve to increase or decrease the output power of the nuclear reactor and to shutdown the nuclear reactor. An upper support structure 19 transmits axial forces from the nuclear core 10, in the upward direction, from the upper core plate 23 through upper support columns 20 to the upper portion of the reactor pressure vessel 12.

The nuclear fission process which of course, is carried on within the nuclear core 10, produces heat which is removed by flowing a reactor coolant through the nuclear core 10. In thermal or slow nuclear reactors, the reactor coolant, which most often comprises water, also acts as a neutron moderator serving to decrease the speed of fast neutrons in order to optimize the fission process consonant with the type of nuclear fuel that is used. The reactor coolant enters the reactor pressure vessel 12 through an inlet duct 21 located in an upper part of the reactor pressure vessel 12. The reactor coolant flows down through an annulus between the wall of the reactor pressure vessel 12 and the core barrel 15 until it reaches the bottom of the reactor pressure vessel 12 where it turns 180° prior to flowing up through the nuclear core 10. On flowing through the nuclear core 10 the reactor coolant is heated to reactor operating temperatures by forced convection heat transfer from the fuel assemblies 11 to the reactor coolant. The hot reactor coolant then exits the reactor pressure vessel 12 through an outlet duct 22 and flows to a heat exchanger (not shown). The heat thus acquired by the reactor coolant is then transferred to another cooling system coupled in heat transfer relationship to the heat exchanger (not shown). The reactor coolant is then pumped back into the reactor pressure vessel 12 repeating the aforementioned flow cycle.

A typical fuel assembly 11, suitable for use in the type of thermal reactor shown in FIG. 1, is shown in FIG. 2. Basically, the fuel assembly 11 consists of a square array of individual fuel elements 13 supported at the ends thereof by an inlet nozzle 24 and an outlet nozzle 25. Grids 26 spaced along its length provide the fuel assembly 11 with intermediate supports. A control rod 27 which is used with the type of fuel assembly 11 depicted in FIG. 2 is also shown in this drawing. The control rod 27 comprises a central hub or spider 28 having attached thereto in the manner shown, a plurality of elongated control elements 29. The control elements 29 fit within control rod guide thimbles 30 comprising hollow elongated tubes which are positioned within the fuel assembly 11 The number of control rods 27 is generally not equal to the number of fuel assemblies 11; there are usually a greater number of fuel assemblies. Thus, in those fuel assemblies 11 not having a control rod 27, the control rod guide thimbles 30 are replaced by fuel elements 11.

FIG. 3 shows a typical fuel element 13 for use in a pressurized water nuclear reactor. The fuel element 13 consists of an elongated hollow tube or cladding 31 which is filled with nuclear fuel in the form of pellets 32 and is sealed by end caps 33 which are welded to cladding 31. In addition to serving as a convenient container for handling of the nuclear fuel, the cladding serves the purpose of protecting the fuel from erosion and corrosion during reactor operation, as well as preventing fission product contamination of the reactor coolant. The length of the fuel element 13 for the type of reactor illustrated in FIG. 1 is approximately 12 feet.

In a preferred embodiment of this invention, an upper portion of the fuel element 13, designated by the reference character 34, is filled with uranium oxide enriched in the uranium-235 isotope. The length of portion 34 of fuel element 13 is approximately equal to two-thirds of the total length of the fuel element 13; therefore, in the example shown, the length of fuel element portion 34 is approximately eight feet or ninety-six inches. A lower portion of the fuel element 13, designated by reference character 35, represents approximately one-third of the length of the fuel element 13. Portion 35 of the fuel element 13 is approximately forty-six inches long and is filled with recycled plutonium oxide. The plutonium oxide and the enriched uranium-235 (uranium oxide) are manufactured in the form of cylindrical pellets. An intermediate portion 36 of the fuel element 13, positioned between the upper and lower portions 34 and 35 respectively, is filled with natural uranium, that is, uranium oxide which is not enriched in the uranium-235 isotope. The length of fuel element portion 36 is approximately two inches long for the example shown.

It is to be observed that the lengths of fuel element portions 34, 35 and 36 are not critical. These lengths may vary from the figures given in accordance with: the amount of plutonium to be recycled, the design power of the nuclear reactor, the location of the fuel element within the fuel assembly and the location of the fuel assembly within the nuclear core, and other like mechanical and nuclear considerations.

As previously mentioned, the buffer portion 36 of the fuel element 13 containing the natural uranium serves the purpose of depressing the power peak which exists at the interface between fuel element portions 34 and 35. The peak flux which also exists at this interface is correspondingly reduced thereby obtaining an axial flux distribution not unlike that of previous nuclear cores. Since the buffer portion 36 also suppresses radial power peaking and flux peaking at the enriched uranium-plutonium interface between adjacent fuel elements, the buffer portion 36 permits wide manufacturing tolerances in the lengths of fuel element portions 34 and 35.

The nuclear core, shown in cross section in FIG. 4, represents one of many nuclear fuel arrangements in accordance with the teachings of this invention. The arrangement shown discloses a preferred method of combining different types of fuel elements in the same core. Fuel assembly 38 is comprised of fuel elements 41 which contain only enriched uranium-235. Fuel assemblies 37, 39 and 42 contain two different types of fuel elements, 13 and 40. Fuel elements 13 contain plutonium natural uranium and enriched uranium as shown in FIG. 3. Fuel elements 40 contain enriched uranium in the upper two-thirds of the element and natural uranium in the lower one-third of the element. The natural uranium in fuel element 40 serves the same purposes as the buffer zone 36 in fuel element 13 depicted in FIG. 3. That is, it serves to depress the power and neutron flux spikes which exist at the interface between adjacent fuel elements 13 and fuel elements 41.

From the foregoing description, taken in connection with the drawings, it is seen that this invention provides a nuclear core for a thermal reactor which makes use of a significant quantity of recycled plutonium fuel with little or no impact on nuclear power plant design.

Since numerous changes may be made in the above described apparatus and different embodiments of the invention may be made without departig from the spirit and scope thereof, it is intended that all the matter contained in the foregoing description or shown in the accompanying drawings shall be interpreted as illustrative and not in a limiting sense.

I claim as my invention:

1. A core for a thermal nuclear reactor controlled at least partially by selectively positioned reciprocating neutron poison elements, said core comprising a plurality of fueled regions containing fissile material, said fueled regions being arranged in tandem one above another, with a first region being fueled with enriched fissile uranium, a second region being the only region fueled with fissile plutonium, and an intermediate region including natural uranium interposing said first and second regions, said second region being the outermost fissile material containing region of said core only at one extremity of said core, said regions further being arranged such that said reciprocating control elements can be selectively positioned within and withdrawn from said core and, upon entering said core from a withdrawn position, said elements pass in series through said first region and then into said second region said core being substantially free from plutonium except for said first region.

2. The core of claim 1, wherein said upper region fueled with enriched uranium has a length substantially equal to two-thirds the total length of the core and said lower region fueled with plutonium has a length substantially equal to one-third the total length of the core.

3. A core for a thermal nuclear reactor, said core comprising a plurality of coextending, clad fuel elements arranged in a parallel array and having a substantially circular cross-sectional configuration, said fuel elements being vertically positioned within a reactor pressure vessel, said core being of a type which is moderated and cooled by water which flows in a first direction down the inside of said pressure vessel and then flows in a second direction up through said core, wherein each of said fuel elements comprises a plurality of tandem arranged fuel regions one above another with a first region being fueled with fissile plutonium which extends upward from the reactor coolant inlet end of said core, a second region being fueled with enriched fissile uranium which extends downward from the reactor coolant outlet end of said core, and an intermediate region including natural uranium interposing said first and second regions, said fuel element being substantially free from plutonium except for said first region.

4. The core of claim 3, including a multiplicity of fuel elements positioned around the radial periphery of said plurality of fuel elements, wherein each of said fuel elements is fueled with enriched uranium.

5. A core for a thermal nuclear reactor circulating water from an entry region of said core to an exit region of said core, said core comprising a plurality of fueled regions containing fissile material, said fueled regions being arranged in tandem one above another, with a first region being fueled with enriched uranium, a second region being fueled with fissile plutonium, and an intermediate region including natural uranium interposing said first and second regions, said regions further being arranged such that said first region is at said exit region of said core and said second region is at said entry region of said core, said core being substantially free from plutonium except for said second region.

6. In a thermal nuclear reactor having a pressure vessel, means for circulating a coolant including water through said vessel, and means for positioning reciprocating control elements within said vessel, a core disposed within said vessel having a coolant inlet region and a coolant outlet region and comprising a plurality of fueled regions being arranged in tandem one above another to form a core length dimension, with a first fueled region disposed at said outlet region being fueled with enriched, and a second region disposed at said inlet region being the only region fueled with fissile plutonium, and an intermediate region including natural uranium interposing said first and second regions, said core further being disposed within said vesel such that said reciprocating control elements can be selectively positioned within and withdrawn from said core along said length dimension through said outlet region said core being substantially free from plutonium except for said second region.

* * * * *